US012744342B2

(12) United States Patent
Nozaki et al.

(10) Patent No.: US 12,744,342 B2
(45) Date of Patent: Sep. 22, 2026

(54) TERMINAL FITTING AND CHAIN TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Nozaki, Mie (JP); Hideto Nakamura, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 329 days.

(21) Appl. No.: 18/570,227

(22) PCT Filed: Jun. 13, 2022

(86) PCT No.: PCT/JP2022/023570

§ 371 (c)(1),
(2) Date: Dec. 14, 2023

(87) PCT Pub. No.: WO2022/264955

PCT Pub. Date: Dec. 22, 2022

(65) Prior Publication Data

US 2024/0283183 A1 Aug. 22, 2024

(30) Foreign Application Priority Data

Jun. 15, 2021 (JP) ................................ 2021-099238

(51) Int. Cl.
*H01R 13/24* (2006.01)
*H01R 13/187* (2006.01)
*H01R 13/422* (2006.01)

(52) U.S. Cl.
CPC ....... *H01R 13/2428* (2013.01); *H01R 13/422* (2013.01); *H01R 13/187* (2013.01)

(58) Field of Classification Search
CPC ................ H01R 13/24; H01R 13/2407; H01R 13/2428; H01R 13/422; H01R 13/11; H01R 13/187
(Continued)

(56) References Cited

U.S. PATENT DOCUMENTS 4,778,404 A * 10/1988 Pass ................... H01R 13/2428 439/948
5,540,599 A * 7/1996 Bishop ............... H01R 13/2428 439/700
(Continued)

FOREIGN PATENT DOCUMENTS

CN 201741885 U 2/2011
JP 2012-226831 A 11/2012
(Continued)

OTHER PUBLICATIONS

International Search Report issued on Aug. 2, 2022 for WO 2022/264955 A1 (4 pages).

*Primary Examiner* — Renee S Luebke
*Assistant Examiner* — Paul D Baillargeon
(74) *Attorney, Agent, or Firm* — Venjuris, P.C.

(57) ABSTRACT

It is aimed to provide a terminal fitting and a chain terminal capable of maintaining connection reliability to a mating terminal. A terminal fitting (45) is provided with a box portion 46, into which a mating terminal 18 is inserted from front, a base portion (47) fixed in the box portion (46), a contact portion (48) arranged forward of the base portion (47) and configured to electrically contact the mating terminal (18) being inserted into the box portion (46), and a spring portion (49) provided to link the base portion (46) and the contact portion (48) and support the contact portion (48) displaceably in an insertion direction (R) of the mating terminal (18). The spring portion (49) is shaped such that a plurality of plate portions (49A) elongated in a direction
(Continued)

intersecting the insertion direction (R) are folded and linked while being spaced apart in the insertion direction (R).

8 Claims, 10 Drawing Sheets

(58) Field of Classification Search
USPC .................................................. 200/275, 278
See application file for complete search history.

(56) References Cited

U.S. PATENT DOCUMENTS

| | | | | |
|---|---|---|---|---|
| 6,059,595 | A | 5/2000 | Lacrouts-Cazenave | |
| 7,607,952 | B2 * | 10/2009 | Tai | H01R 13/2428 439/700 |
| 7,767,921 | B2 * | 8/2010 | Schloms | H01H 85/08 200/275 |
| 8,939,802 | B2 * | 1/2015 | Hara | H01R 13/05 439/867 |
| 9,620,882 | B2 * | 4/2017 | Chen | H01R 13/2428 |
| 10,116,071 | B2 * | 10/2018 | Li | H01R 12/714 |
| 2002/0077000 | A1 | 6/2002 | Nimura | |
| 2003/0190847 | A1 | 10/2003 | Nankou et al. | |
| 2013/0210253 | A1 * | 8/2013 | Nagasawa | H01R 33/46 439/226 |
| 2015/0340772 | A1 * | 11/2015 | Kawamura | H01R 4/187 439/877 |
| 2016/0226175 | A1 | 8/2016 | Chen et al. | |
| 2019/0148863 | A1 | 5/2019 | Horiuchi et al. | |

FOREIGN PATENT DOCUMENTS

| | | | |
|---|---|---|---|
| JP | 2015-015103 | A | 1/2015 |
| WO | 2016/047785 | A1 | 3/2016 |

* cited by examiner

TERMINAL FITTING AND CHAIN TERMINAL

CROSS REFERENCE TO RELATED APPLICATIONS

This application is a national phase of PCT application No. PCT/JP2022/023570, filed on 13 Jun. 2022, which claims priority from Japanese patent application No. 2021-099238, filed on 15 Jun. 2021, all of which are incorporated herein by reference.

TECHNICAL FIELD

The present disclosure relates to a terminal fitting and a chain terminal.

BACKGROUND

Patent Document 1 discloses a butting connector provided with a first butting terminal fitting having a butting surface formed to project and a second butting terminal fitting formed such that a plurality of leaf spring pieces are alternately juxtaposed on the same plane. In the connector of Patent Document 1, if the butting surface butts against the leaf spring pieces, the leaf spring pieces are resiliently deformed, whereby a predetermined contact pressure is generated between the butting surface and the leaf spring pieces to make the butting surface and the leaf spring pieces conductive.

PRIOR ART DOCUMENT

Patent Document

Patent Document 1: JP 2015-015103 A

SUMMARY OF THE INVENTION

Problems to be Solved

However, in the connector of Patent Document 1, since the single leaf spring piece has a cantilever shape, a displacement amount of the leaf spring piece in a connection direction is small. Thus, if dimensions of each component vary in the connection direction (i.e. a direction in which the butting surface butts against the leaf spring pieces), there is a concern about a situation where the butting surface and the leaf spring pieces do not become conductive.

A terminal fitting and a chain terminal of the present disclosure were completed on the basis of the above situation, and it is aimed to provide a terminal fitting and a chain terminal capable of maintaining connection reliability to a mating terminal.

Means to Solve the Problem

A first aspect of the present disclosure is directed to a terminal fitting with a box portion, a mating terminal being inserted into the box portion from front, a base portion fixed in the box portion, a contact portion arranged forward of the base portion, the contact portion electrically contacting the mating terminal being inserted into the box portion, and a spring portion provided to link the base portion and the contact portion, the spring portion supporting the contact portion displaceably in an insertion direction of the mating terminal, the spring portion being shaped such that a plurality of plate portions elongated in a direction intersecting the insertion direction are folded and linked while being spaced apart in the insertion direction.

A second aspect of the present disclosure is directed to a chain terminal with one carrier and a plurality of the terminal fittings of the first aspect of the present disclosure, the plurality of terminal fittings projecting from the carrier while being arranged in parallel, the terminal fitting including a crimping portion projecting from the box portion, and the spring portion and the crimping portion being arranged between the box portion and the carrier in a developed state before the terminal fitting is bent.

Effect of the Invention

According to the present disclosure, connection reliability to a mating terminal can be maintained.

DETAILED DESCRIPTION TO EXECUTE THE INVENTION

Description of Embodiments of Present Disclosure

First, embodiments of the present disclosure are listed and described.

(1) The terminal fitting of the present disclosure is provided with a box portion, a base portion, a contact portion and a spring portion. A mating terminal is inserted into the box portion from front. The base portion is fixed in the box portion. The contact portion is arranged forward of the base portion and electrically contacts the mating terminal being inserted into the box portion. The spring portion is provided to link the base portion and the contact portion, and supports the contact portion displaceably in an insertion direction of the mating terminal. The spring portion is shaped such that a plurality of plate portions elongated in a direction intersecting the insertion direction are folded and linked while being spaced apart in the insertion direction. According to this configuration, since the plurality of plate portions constituting the spring portion are arranged while being spaced apart in the insertion direction, a large displacement amount of the contact portion in the insertion direction can be secured if the contact portion is pressed in the insertion direction by the mating terminal. In this way, connection reliability to the mating terminal can be maintained even if dimensions of each component vary.

(2) Preferably, the terminal fitting of the present disclosure is such that the plate portions adjacent in the insertion direction, the plate portion and the base portion, and the plate portion and the contact portion are respectively linked by coupling portions having a bent shape, and an odd number of the coupling portions are provided. According to this configuration, since the number of the plate portions is an even number, the orientation of the contact portion hardly deviates.

(3) Preferably, the plate portion of the terminal fitting of the present disclosure is formed to be narrower in width with distance from the coupling portions. According to this configuration, since a load applied to each coupling portion can be distributed to the plate portions when the contact portion is pressed in the insertion direction by the mating terminal, the coupling portions can be made difficult to fatigue.

(4) In the chain terminal including a plurality of the terminal fittings of any one of (1) to (3) described above projecting from one carrier while being arranged in parallel, the terminal fitting includes a crimping portion projecting from the box portion. The spring portion and the crimping portion are arranged between the box portion and the carrier in a developed state before the terminal fitting is bent. According to this configuration, a material between the box portion and the carrier can be effectively utilized as compared to the case where the spring portion and the box portion are arranged along the carrier.

DETAILS OF EMBODIMENT OF PRESENT DISCLOSURE

Embodiment

Figure 1:
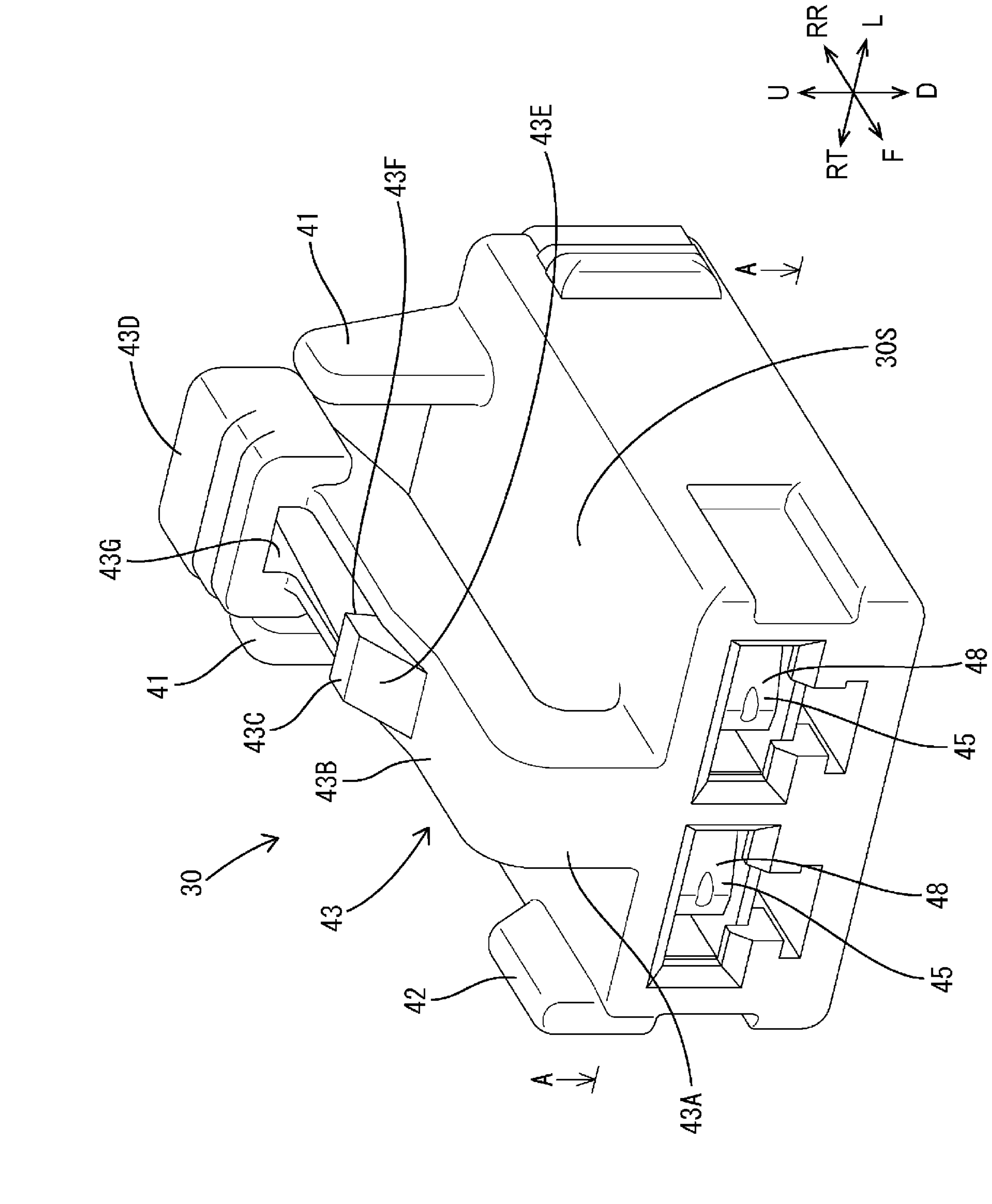
FIG. 1 is a perspective view of a female housing having terminal fittings inserted therein.
Figure 2:
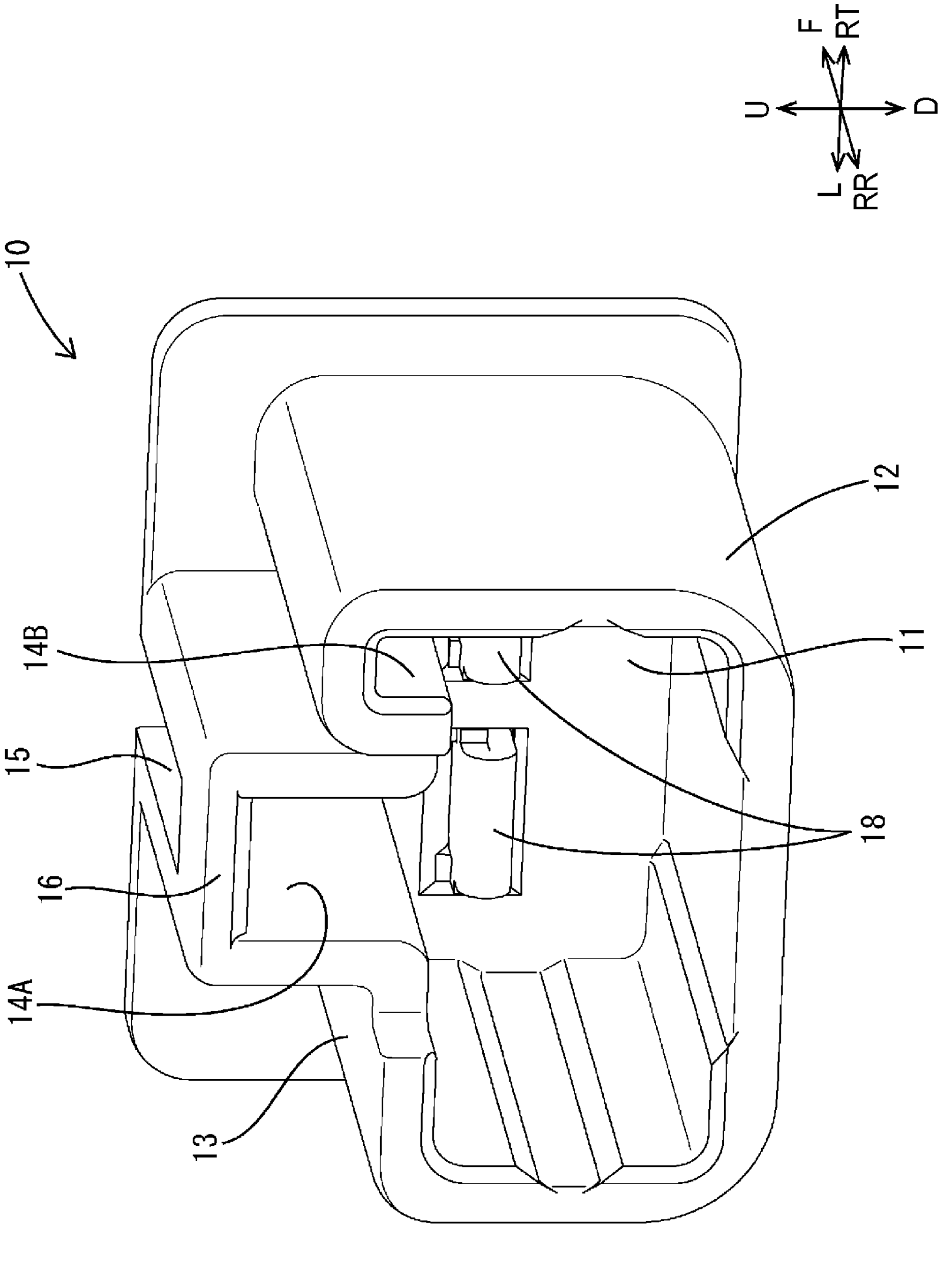
FIG. 2 is a perspective view of a male housing having mating terminals inserted therein.
Figure 3:
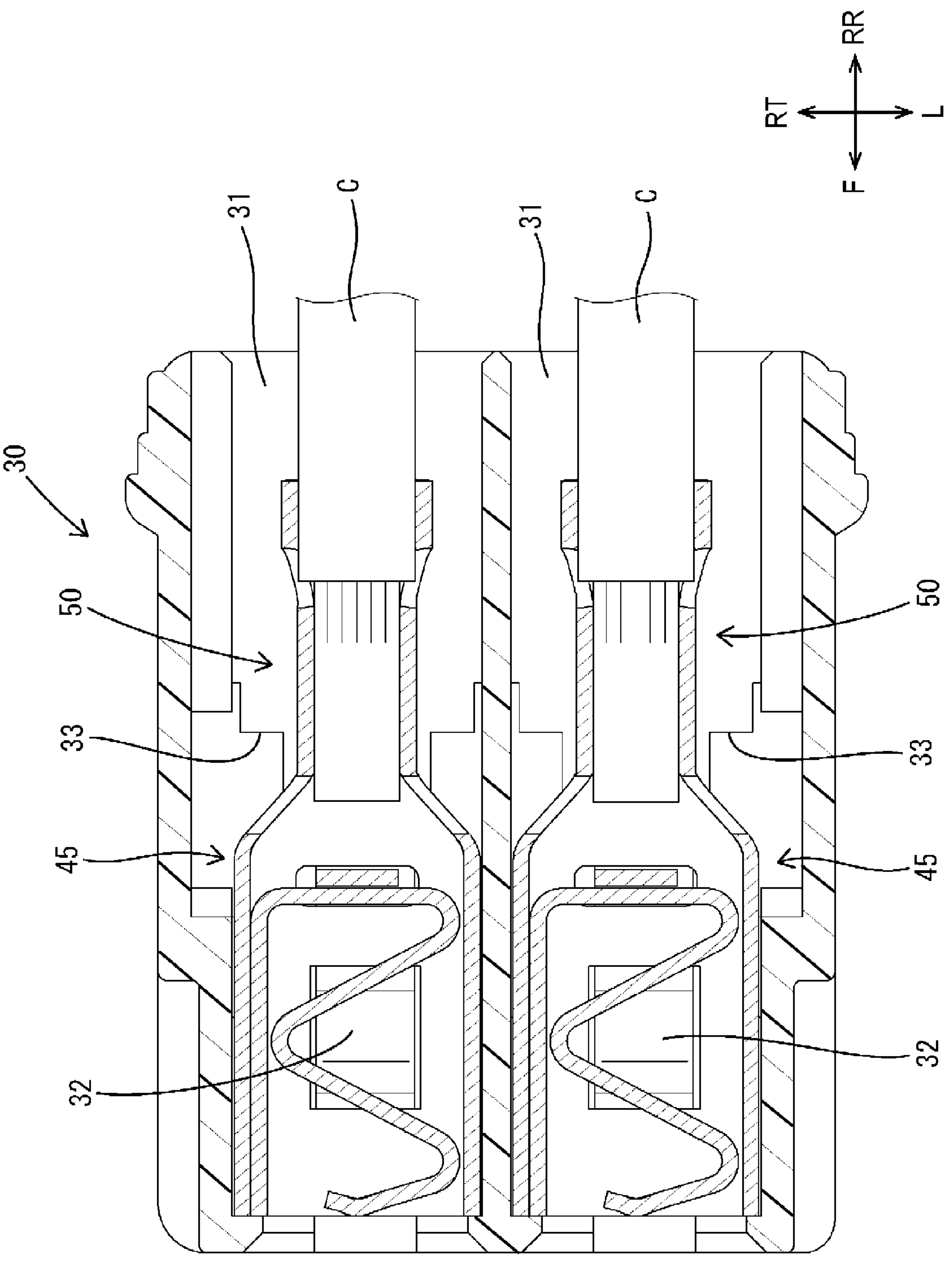
FIG. 3 is a section along A-A in FIG. 1.

One specific embodiment of the present disclosure is described with reference to FIGS. 1 to 10. In this embodiment, left and right sides in FIG. 3 are defined as front and rear sides concerning a front-rear direction. Frontal and back sides of FIG. 3 are defined as upper and lower sides concerning a vertical direction. Upper and lower sides of FIG. 3 are defined as right and left sides concerning a lateral direction.

A terminal fitting 45 of the present disclosure is for electrically contacting a mating terminal 18. As shown in FIG. 1, the terminal fitting 45 is mounted in a female housing 30. As shown in FIG. 2, the mating terminal 18 is mounted in a male housing 10.

[Male Housing]

The male housing 10 is made of synthetic resin. The male housing 10 is in the form of a block as a whole. The male housing 10 includes a wall-like terminal holding portion 11, through which the mating terminals 18 are passed, and a receptacle 12 in the form of a rectangular tube projecting toward the female housing 30 from the outer peripheral edge of the terminal holding portion 11.

An upper wall portion 13 of the receptacle 12 is formed with a first escaping recess 14A and a second escaping recess 14B by recessing the inner surface (lower surface) of the upper wall portion 13 upward. The first escaping recess 14A is disposed in a central part in the lateral direction and extends in the front-rear direction from the tip (opening end) to the back end of the receptacle 12. The second escaping recess 14B is disposed on a right side in the lateral direction and extends in the front-rear direction from the tip (opening end) to the back end of the receptacle 12.

A hole 15 penetrating through the upper wall portion 13 is formed in a region of the upper wall portion 13 where the first escaping recess 14A is formed. The hole 15 is disposed at a position slightly backward of the tip (opening end) of the receptacle 12. A locking portion 16 is formed on a side closer to the tip than the hole 15 and on an opening edge part (tip part) of the receptacle 12. A surface of the locking portion 16 facing the hole 15 is formed as a locked surface 17 (see FIGS. 8 and 9). The locking portion 16 is disposed in front of and adjacent to the hole 15.

[Mating Terminal]

Figure 8:
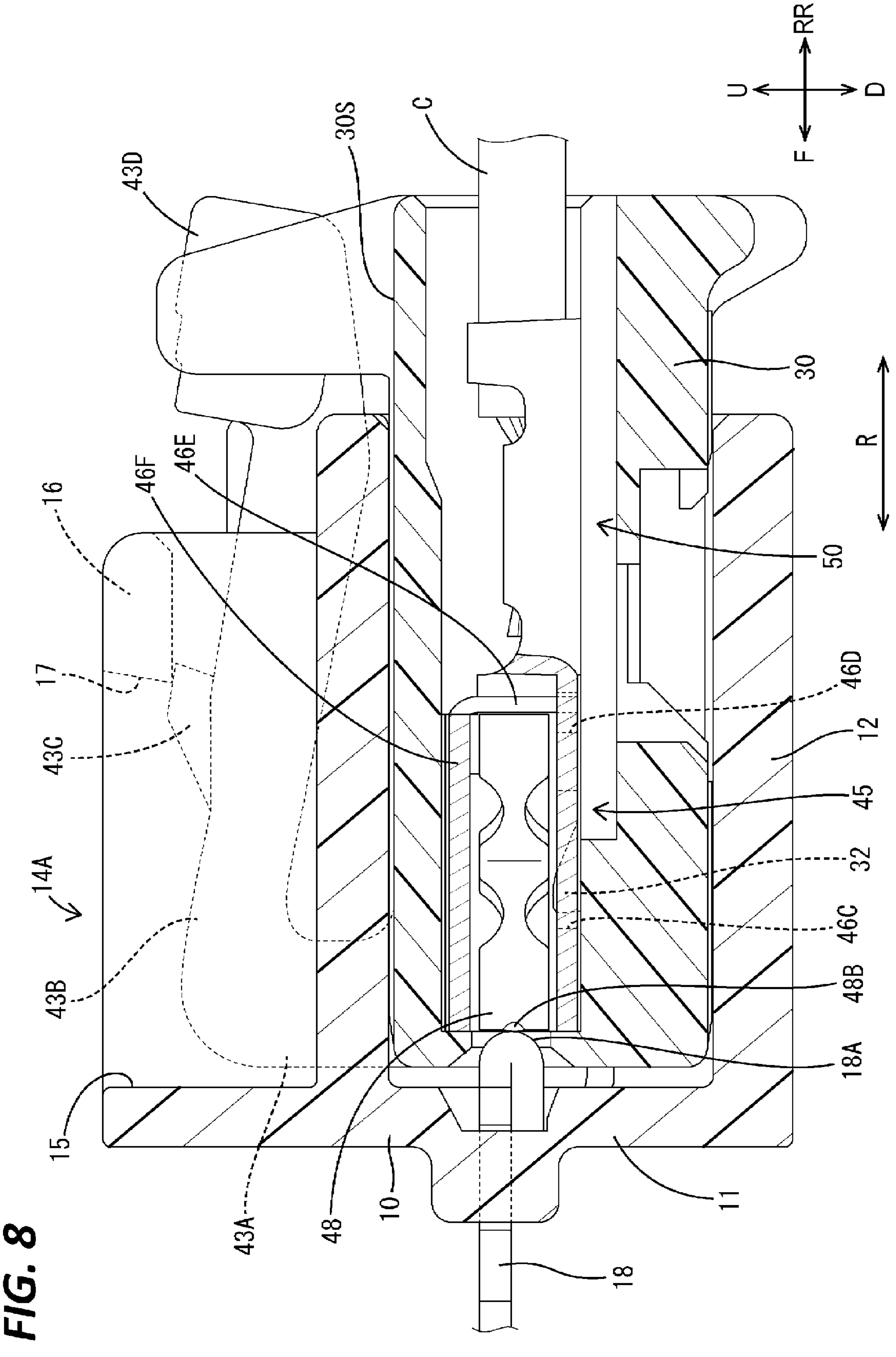
FIG. 8 is a side view in section showing the process of connecting the female housing and the male housing.
Figure 9:
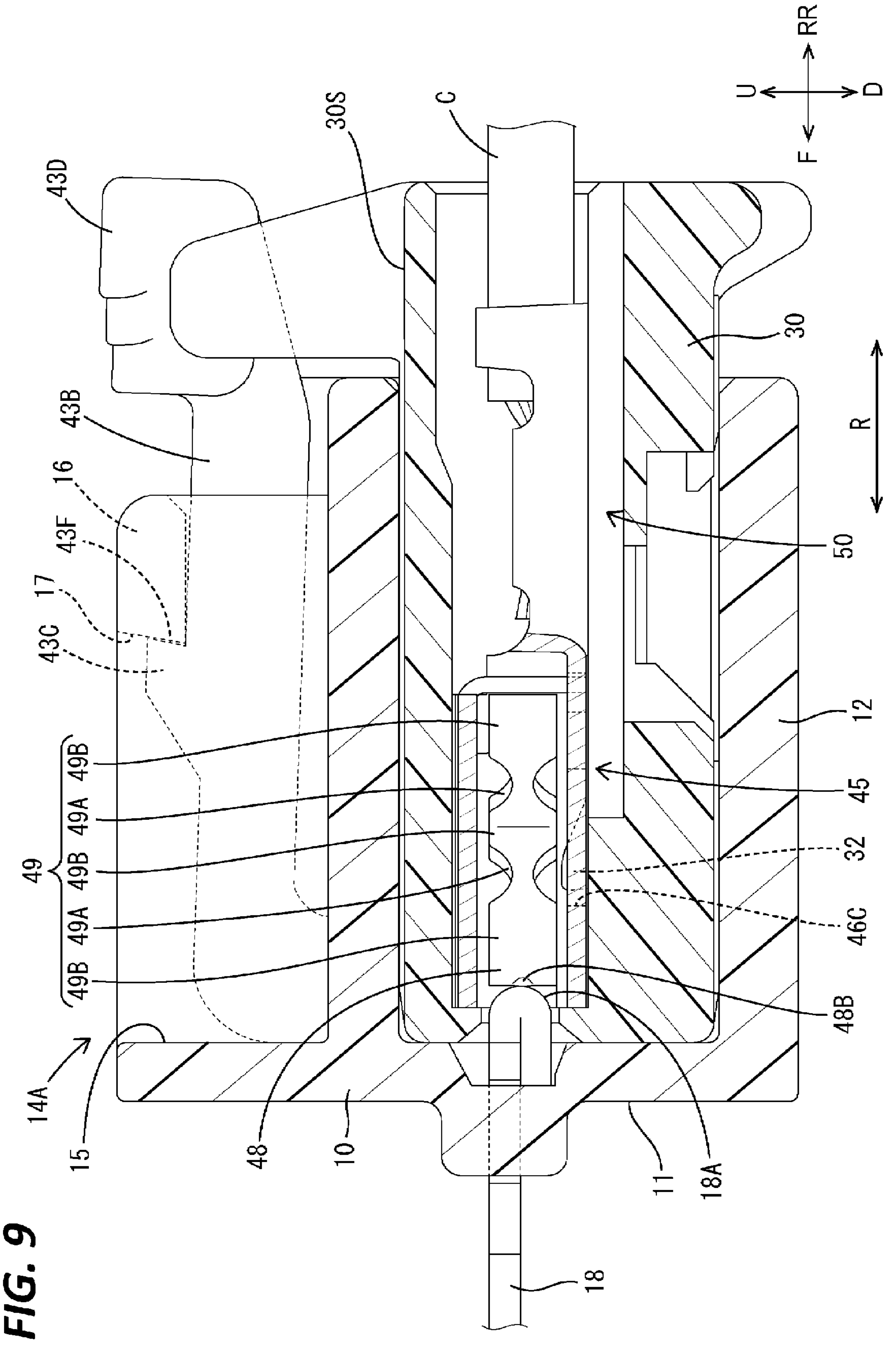
FIG. 9 is a side view in section showing a state where the connection of the female housing and the male housing is completed.

The mating terminal 18 is in the form of an elongated strip made of metal. As shown in FIGS. 8 and 9, one end part of the mating terminal 18 is exposed to the outside of the terminal holding portion 11 and extends. The other end part of the mating terminal 18 projects into the receptacle 12 from the terminal holding portion 11, and is formed by being folded toward the one end part. The other end part of the mating terminal 18 is formed with a contact surface 18A curved toward the opening end of the receptacle 12. A bead portion 48B of a contact portion 48 of the terminal fitting 45 electrically contacts the contact surface 18A.

[Female Housing]

The female housing 30 is made of synthetic resin. The female housing 30 is in the form of a block as a whole. As shown in FIG. 3, the female housing 30 is formed with a plurality of terminal accommodation chambers 31 penetrating through the female housing 30 in the front-rear direction. The plurality of terminal accommodation chambers 31 are aligned and arranged in the lateral direction. A resiliently deformable locking lance 32 is formed in a front end part of the terminal accommodation chamber 31.

The female housing 30 includes an accommodation space 33. The accommodation space 33 is open in the lower surface of the female housing 30. The accommodation space 33 communicates with all the terminal accommodation chambers 31. The accommodation space 33 is disposed in a central part (position behind the locking lances 32) of the female housing 30 in the front-rear direction. An unillustrated retainer for retaining the terminal fittings 45 inserted into the female housing 30 (terminal accommodation chambers 31) is fit into the accommodation space 33.

As shown in FIG. 1, an upper wall 30S of the female housing 30 is provided with a pair of projecting portions 41 projecting upward, a protruding portion 42 projecting upward and a lock portion 43. The pair of projecting portions 41 are disposed on a rear end part of the female housing 30 and bilaterally symmetrical. The protruding portion 42 is disposed on a front end part on a right side of the female housing 30.

The lock portion 43 includes a base portion 43A, an arm portion 43B, a locking piece 432C and an operating portion 43D. The base portion 43A rises upward from a front end part of the upper wall 30S of the female housing 30. The arm portion 43B is cantilevered rearward from the tip of the base portion 43A. The locking piece 43C is provided to project upward in a central part in the front-rear direction of the arm portion 43B. A front side of the locking piece 43C is formed as an inclined surface 43E inclined upward toward a rear side, and the rear end thereof is formed as a locking surface 43F formed in the vertical direction.

The operating portion 43D is provided to project upward on a tip part of the arm portion 43B. A mold removal hole 43G formed in molding the locking surface 43F is open in the operating portion 43D. The tip part (rear end part) of the arm portion 43B and the operating portion 43D are arranged between the pair of projecting portions 41. The operating portion 43D can deflect the arm portion 43B downward toward the upper wall 30S and displace the locking piece 43C downward by being pressed downward.

[Terminal Fitting]

Figure 4:
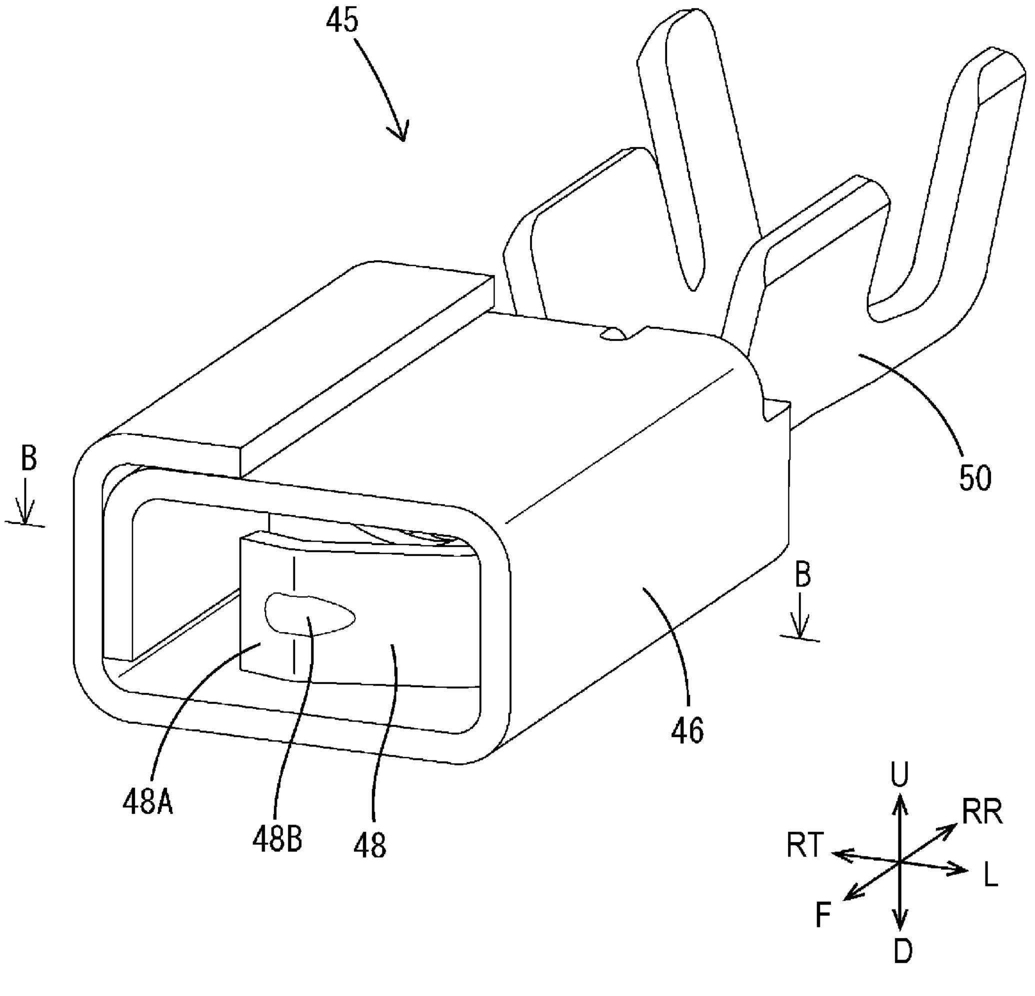
FIG. 4 is a perspective view of the terminal fitting.
Figure 5:
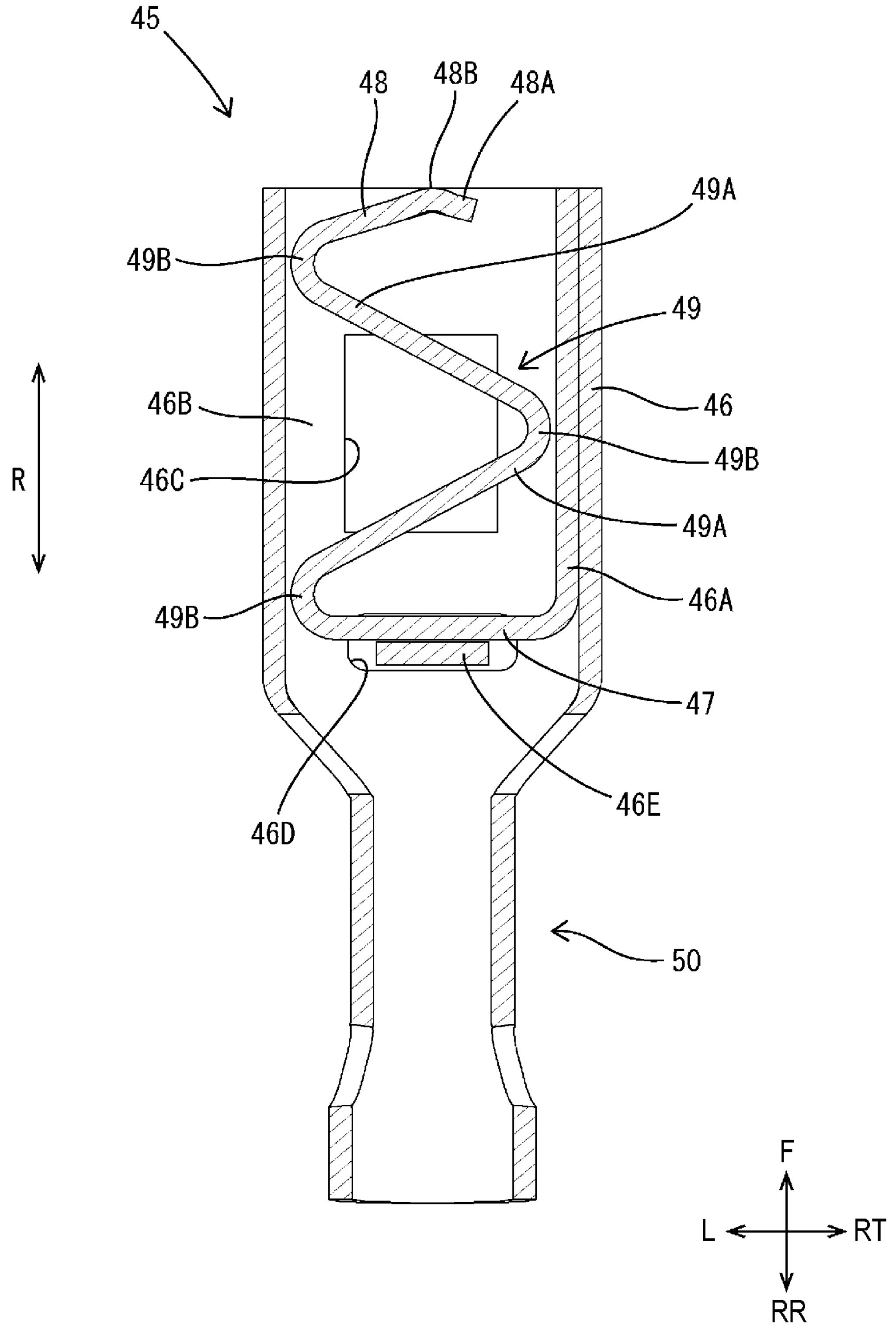
FIG. 5 is a section along B-B in FIG. 4.

The terminal fitting 45 is a single member formed, such as by bending a metal plate material, and has a shape elongated in the front-rear direction as a whole. As shown in FIGS. 4 and 5, the terminal fitting 45 is provided with a box portion 46, a base portion 47, the contact portion 48, a spring portion 49 and a crimping portion 50.

The box portion 46 is in the form of a rectangular box with open front and rear ends. The mating terminal 18 is inserted into the box portion 46 from front (see FIG. 9). The base portion 47 has a base end fixed to a rear end part of a right wall 46A of the box portion 46 and extends leftward to close a rear end part of the box portion 46. That is, the base portion 47 is fixed in the box portion 46. A locked hole 46 penetrating in a plate thickness direction is formed to be open in a lower wall 46B of the box portion 46 (see FIG. 5).

A through hole 46D penetrating in the plate thickness direction is formed to be open at a position behind the locked hole 46C in the lower wall 46B (see FIG. 5). Further, a supporting portion 46E is provided behind and adjacent to the base portion 47 (see FIG. 5). The supporting portion 46E has a base end fixed to a rear end part of an upper wall 46F of the box portion 46 and extends downward to close the rear end part of the box portion 46 (see FIG. 8). A tip part of the supporting portion 46E is inserted into the through hole 46D (see FIG. 8).

The contact portion 48 is provided in the box portion 46 to close a front end part of the box portion 46. The contact portion 48 is arranged forward of the base portion 47 in the box portion 46. The contact portion 48 extends in a direction intersecting the front-rear direction and lateral direction, and is provided with a bent portion 48A bent rearward in a front end part. The bead portion 48B is formed to bulge forward in a base end part of the bent portion 48A. The bead portion 48B of the contact portion 48 electrically contacts the contact surface 18A of the mating terminal 18 being inserted into the box portion 46 (see FIGS. 8 and 9). The bead portion 48B is arranged at a position along the front end of the box portion 46 in a state before the mating terminal 18 is inserted into the box portion 46 (see FIGS. 5, 8 and 10).

The spring portion 49 is provided to link the base portion 47 and the contact portion 48. The base portion 47, the contact portion 48 and the spring portion 49 are in the form of a strip extending long in one direction in a developed state before bending (see FIG. 7). The spring portion 49 includes a plurality of plate portions 49A and a plurality of coupling portions 49B. The plurality of plate portions 49A are formed and elongated in directions intersecting an insertion direction R. These plate portions 49A are arranged to be folded in the lateral direction while being spaced apart in the insertion direction R. Each plate portion 49A extends in a direction intersecting the front-rear direction and lateral direction. Each plate portion 49A is formed to be narrower in width in a transverse direction toward a center from both ends in a longitudinal direction, thereby being constricted (see FIG. 7).

The plurality of coupling portions 49B have an arcuately bent shape as shown in FIG. 5. The respective coupling portions 49B link the plate portions 49A adjacent in the front-rear direction, the plate portion 49A located on a rear side and the base portion 47 and the plate portion 49A located on a front side and the contact portion 48. Three (i.e. an odd number of) coupling portions 49B are provided. Each plate portion 49A is formed to be narrower in width toward a center in the longitudinal direction from the coupling portions 49B coupled on both ends in the longitudinal direction (see FIG. 7). The crimping portion 50 is provided in a rear part of the terminal fitting 45. The crimping portion 50 projects rearward from the box portion 46. The crimping portion 50 is crimped to a front end part of a wire C (see FIGS. 3, 8 and 9).

The terminal fitting 45 thus configured is inserted into the terminal accommodation chamber 31 from behind the female housing 30 and retained by locking the locking lance 32 into the locked hole 46C (see FIGS. 8 and 9).

[Chain Terminal]

Figure 6:
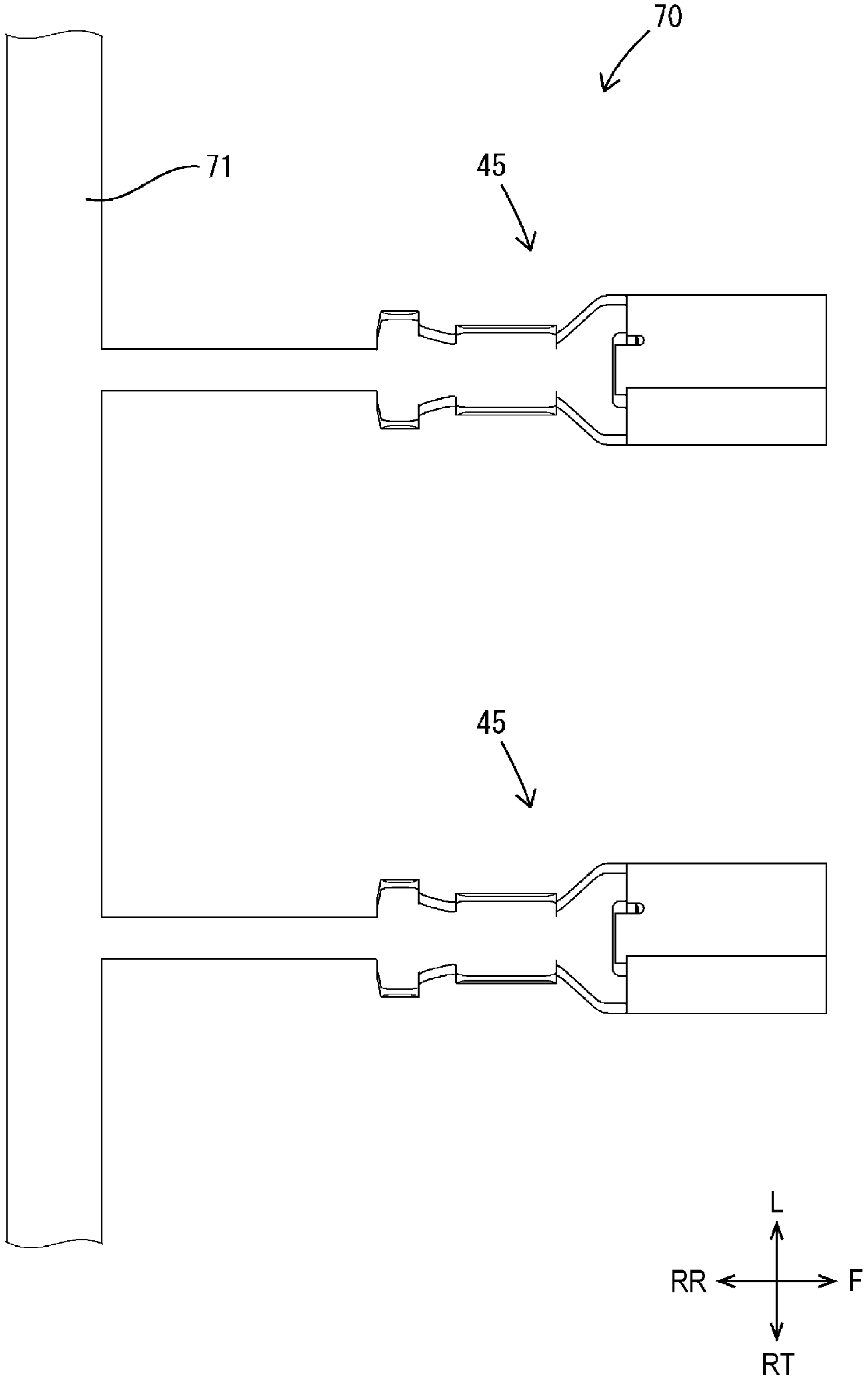
FIG. 6 is a plan view of a chain terminal.

As shown in FIG. 6, the chain terminal 70 is formed, such as by bending a metal plate material stamped into a predetermined shape, and composed of one carrier 71 in the form of an elongated strip and a plurality of the terminal fittings 45 arranged in parallel. The plurality of terminal fittings 45 project substantially perpendicular to a length direction of the carrier 71 from a side edge part of the carrier 71.

[Developed State Before Bending Terminal Fitting]

Figure 7:
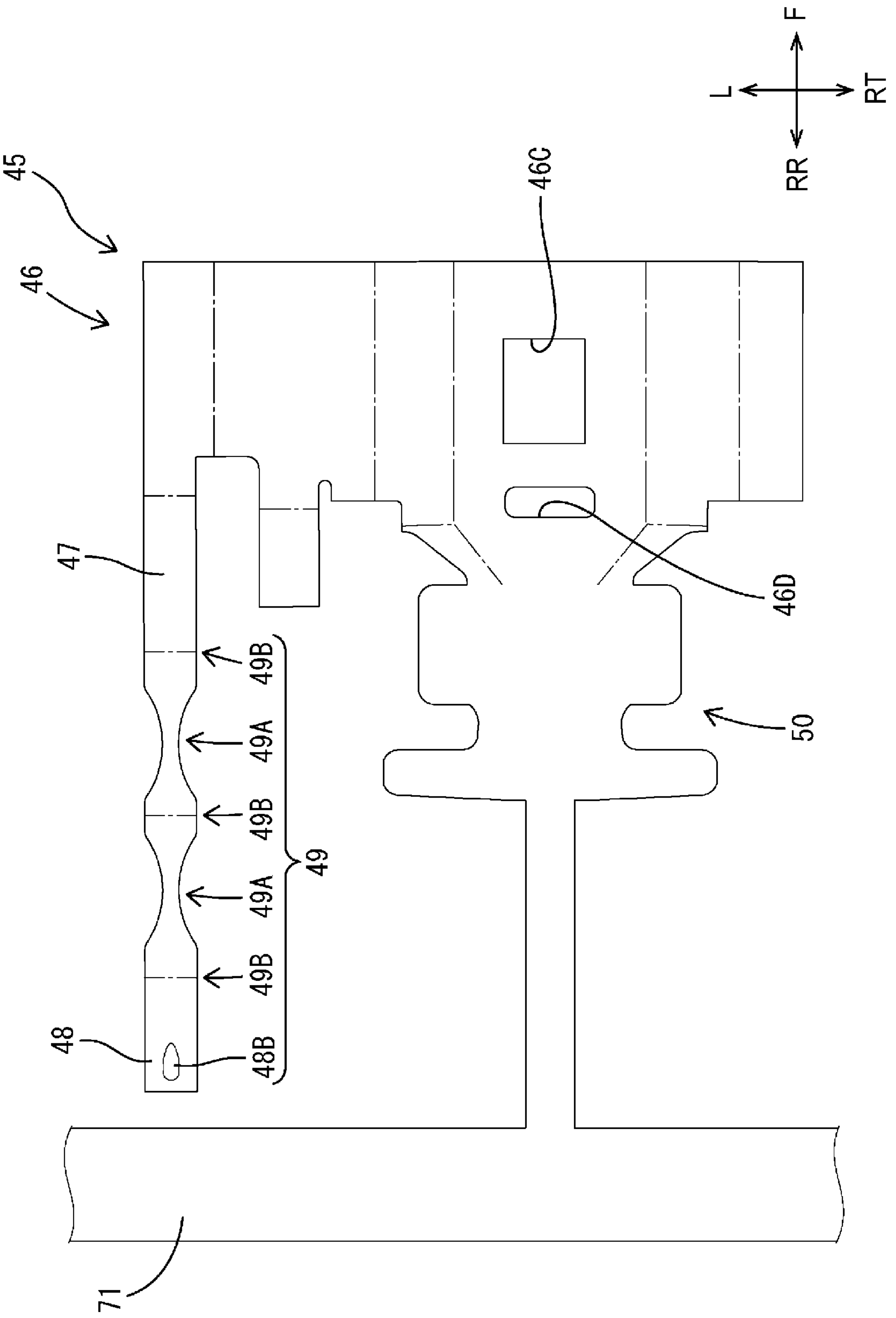
FIG. 7 is a plan view of the chain terminal in a developed state of the terminal fittings.

A developed state before the terminal fitting 45 is bent is described. As shown in FIG. 7, the terminal fitting 45 in the developed state is arranged on the same plane as the carrier 71. Specifically, the carrier 71 is linked to a rear end part of the crimping portion 50 in the developed state. The box portion 46 in the developed state is linked and arranged on the front end of the crimping portion 50 in the developed state. That is, the box portion 46 in the developed state is arranged on a side opposite to the carrier 71 across the crimping portion 50 in the developed state.

The spring portion 49 in the developed state is arranged to extend rearward (i.e. toward the carrier 71) along the left end edge of the box portion 46 in the developed state via the base portion 47 in the developed state. The spring portion 49 in the developed state is arranged adjacent to the crimping portion 50 in the developed state in the length direction of the carrier 71. The spring portion 49 in the developed state and the crimping portion 50 in the developed state are arranged between the box portion 46 in the developed state and the carrier 71.

[Connection of Male Housing and Female Housing]

The receptacle 12 is caused to face the front end of the female housing 30, and the male housing 10 having the mating terminals 18 mounted therein is connected to the female housing 30 from the front of the female housing 30. At this time, a front end part of the lock portion 43 (base end parts of the base portion 43A and the arm portion 43B) is inserted into the first escaping recess 14A of the receptacle 12. Along with this, the protruding portion 42 is inserted into the second escaping recess 14B of the receptacle 12.

Then, the female housing 30 is further fit into the receptacle 12. Then, the lock portion 43 and the protruding portion 12 reach a back part of the receptacle 12. At this time, the locking piece 43C of the lock portion 43 is pressed downward by the locking portion 16, whereby the arm portion 43B is deflected downward (see FIG. 8). Then, the contact surface 18A of the mating terminal 18 reaches the front end of the box portion 46 of the terminal fitting 45 (see FIG. 8). At this time, the contact surface 18A electrically contacts the bead portion 48B of the contact portion 48.

If the female housing 30 is further fit into the receptacle 12, the mating terminal 18 is inserted into the front end part of the box portion 46. At this time, the contact portion 48 of the terminal fitting 45 is pressed rearward by the bead portion 48B of the contact portion 48. In this way, the coupling portions 49B and the plate portions 49A of the spring portion 49 are resiliently deformed and the contact portion 48 moves rearward (see FIGS. 9 and 10). In this way, the spring portion 49 supports the contact portion 48 displaceably in the insertion direction R of the mating terminal 18. The supporting portion 46E is provided behind and adjacent to the base portion 47. The base portion 47 is supported by the supporting portion 46E so as not to be resiliently deformed rearward.

Figure 10:
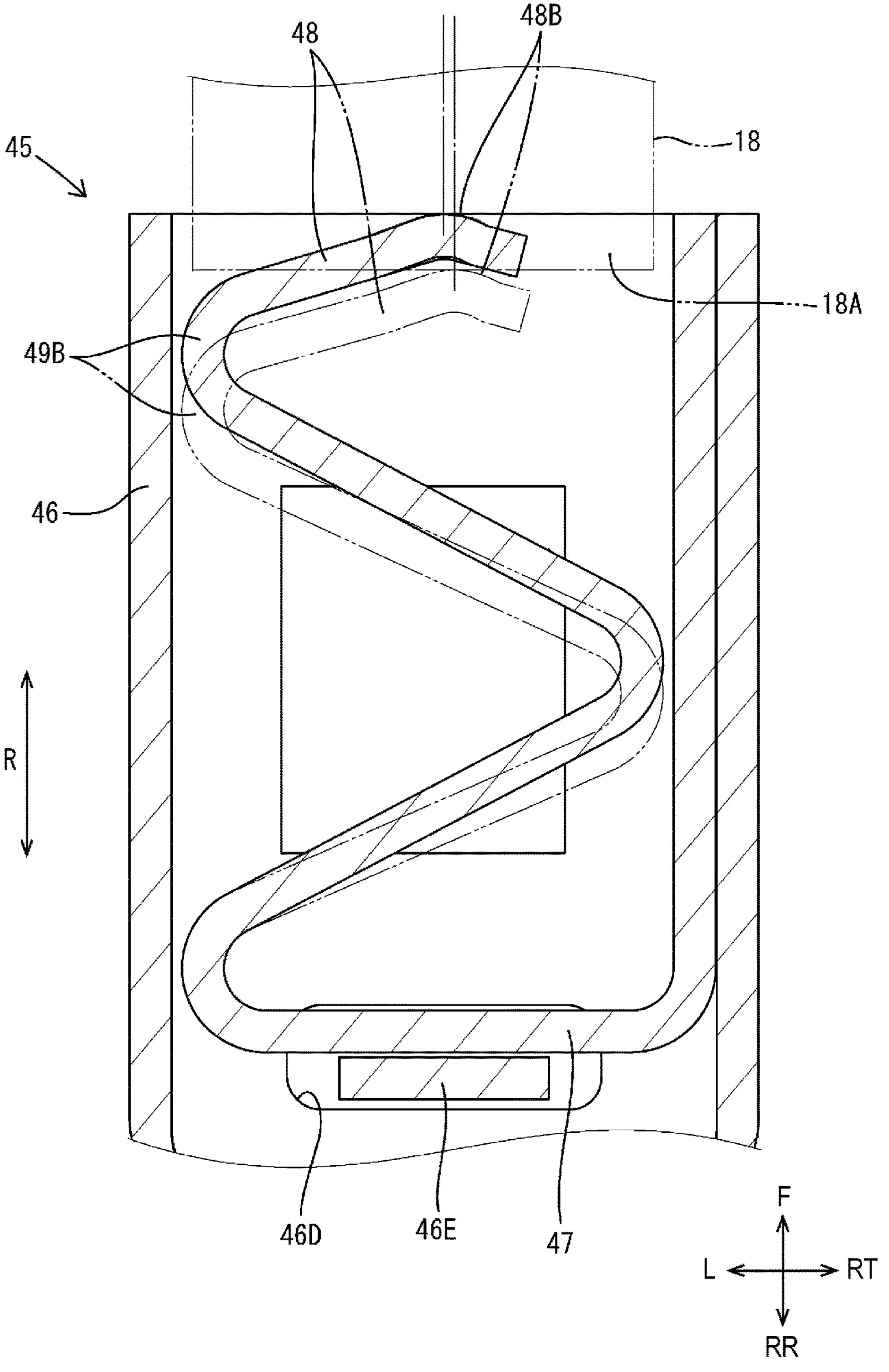
FIG. 10 is a section along B-B in FIG. 4 showing a posture change of a contact portion before and after being pressed by a mating terminal.

When the contact portion 48 moves rearward, the contact portion 48 changes the posture thereof to rotate about the coupling portion 49B coupled to the contact portion 48 as shown in FIG. 10. In this way, the bead portion 48B moves rightward in contact with the contact surface 18A. That is, the bead portion 48B of the contact portion 48 pressed by the mating terminal 18 is displaced in a direction intersecting the insertion direction R as the mating terminal 18 enters the box portion 46. In the entering process of the mating terminal 18 into the box portion 46, the mating terminal 18 and the spring portion 49 do not contact the box portion 46.

If the female housing 30 is further fit into the receptacle 12, the locking piece 43C slips forward under the locking portion 16 and reaches the hole 15 formed in the first escaping recess 14A. Then, the arm portion 43B resiliently returns, whereby the locking surface 43F faces the locked surface 17 of the locking portion 16 (see FIG. 9). In this way, the locking surface 43F is locked to the locking portion 16, whereby the male housing 10 and the female housing 30 are connected. In this way, a connecting operation of the male housing 10 and the female housing 30 is finished.

In separating the male housing 10 and the female housing 30 in the connected state, the operating portion 43D of the lock portion 43 is pressed downward to deflect the arm portion 43B toward the upper wall 30S of the female housing 30. At this time, the locking piece 43C of the lock portion 43 is also displaced downward and moves to below the locking portion 16. In this way, the locking piece 43C is separated from the lock portion 16. Then, the female housing 30 is separated from the male housing 10 with the locking piece 43C and the locking portion 16 kept separated from each other.

When the male housing 10 and the female housing 30 are in the connected state, a reaction force is applied to the mating terminal 18 to be pushed forward from the bead portion 48B of the contact portion 48. Thus, if the locking piece 43C is disengaged from the locking portion 16, the mating terminals 18 and the male housing 10 are pushed out forward in a direction away from the female housing 30 by the reaction forces from the contact portions 48 to the mating terminals 18. In this way, resistance generated in separating the male housing 10 from the female housing 30 is reduced. Then, the locking piece 43C slips rearward under the locking portion 16 and the arm portion 43B resiliently returns. In this way, the separation of the female housing 30 from the male housing 10 is completed.

Next, functions and effects of this embodiment are described.

The terminal fitting 45 of the present disclosure includes the box portion 46, the base portion 47, the contact portion 48 and the spring portion 49. The mating terminal 18 is inserted into the box portion 46 from front. The base portion 47 is fixed in the box portion 46. The contact portion 48 is arranged forward of the base portion 47 and electrically contacts the mating terminal 18 being inserted into the box portion 46. The spring portion 49 is provided to link the base portion 47 and the contact portion 48, and supports the contact portion 48 displaceably in the insertion direction R of the mating terminal 18. The spring portion 49 is shaped such that the plurality of plate portions 49 elongated in the direction intersecting the insertion direction R are folded and linked while being spaced apart in the insertion direction R. According to this configuration, since the plurality of plate portions 49A constituting the spring portion 49 are arranged while being spaced apart in the insertion direction R, a large displacement amount of the contact portion 48 in the insertion direction R can be secured if the contact portion 48 is pressed in the insertion direction R by the mating terminal 18. In this way, even if dimensions of each component vary, connection reliability to the mating terminal 18 can be maintained.

In the terminal fitting 45 of the present disclosure, the plate portions 49A adjacent in the insertion direction R, the plate portion 49A and the base portion 47, and the plate portion 49A and the contact portion 48 are respectively linked by the coupling portions 49B having a bent shape, and three (odd number) coupling portions 49B are provided. According to this configuration, since the number of the plate portions 49A is an even number, the orientation of the contact portion 48 hardly deviates.

The plate portions 49A of the terminal fitting 45 of the present disclosure are formed to be narrower in width with distance from the coupling portions 49B. According to this configuration, since a load applied to each coupling portion 49B can be distributed to the plate portions 49 when the contact portion 48 is pressed in the insertion direction R by the mating terminal 18, the coupling portions 49B can be made difficult to fatigue.

In the chain terminal 70 including the plurality of terminal fittings 45 projecting from one carrier 71 while being arranged in parallel, the terminal fitting 45 includes the crimping portion 50 projecting from the box portion 46. In the developed state before the terminal fitting 45 is bent, the spring portion 49 and the crimping portion 50 are arranged between the box portion 46 and the carrier 71. According to this configuration, a material between the box portion 46 and the carrier 71 can be effectively utilized as compared to the case where the spring portion 49 and the box portion 46 are arranged along the carrier 71.

OTHER EMBODIMENTS

The embodiment disclosed this time should be considered illustrative in all aspects, rather than restrictive. The scope of the present invention is not limited to the embodiment disclosed this time, but is represented by claims and intended to include all changes in the scope of claims and in the meaning and scope of equivalents.

Unlike the above embodiment, an even number of coupling portions may be provided and an odd number of plate portions may be provided.

Unlike the above embodiment, similarly to the plate portions, the base portion and the contact portion may also be formed to be narrower in width with distance from the coupling portion.

LIST OF REFERENCE NUMERALS

10 . . . male housing
11 . . . terminal holding portion
12 . . . receptacle
13 . . . upper wall portion
14A . . . first escaping recess
14B . . . second escaping recess
15 . . . hole
16 . . . locking portion
17 . . . locked surface
18 . . . mating terminal

18A . . . contact surface
30 . . . female housing
30S . . . upper wall
31 . . . terminal accommodation chamber
32 . . . locking lance
33 . . . accommodation space
41 . . . projecting portion
42 . . . protruding portion
43 . . . lock portion
43A . . . base portion
43B . . . arm portion
43C . . . locking piece
43D . . . operating portion
43E . . . inclined surface
43F . . . locking surface
43G . . . mold removal hole
45 . . . terminal fitting
46 . . . box portion
46A . . . right wall
46B . . . lower wall
46C . . . locked hole
46D . . . through hole
46E . . . supporting portion
46F . . . upper wall
47 . . . base portion
48 . . . contact portion
48A . . . bent portion
48B . . . bead portion
49 . . . spring portion
49A . . . plate portion
49B . . . coupling portion
50 . . . crimping portion
70 . . . chain terminal
71 . . . carrier
C . . . wire
R . . . insertion direction

What is claimed is:

1. A terminal fitting, comprising:

a box portion, a mating terminal being inserted into the box portion from front, wherein the box portion comprises an upper wall and a lower wall provided opposite to the upper wall, wherein the lower wall comprises a through hole provided thereon;

a base portion fixed in the box portion;

a contact portion arranged forward of the base portion, the contact portion electrically contacting the mating terminal being inserted into the box portion; and a spring portion provided to link the base portion and the contact portion, the spring portion supporting the contact portion displaceably in an insertion direction of the mating terminal, the spring portion being shaped such that a plurality of plate portions elongated in a direction intersecting the insertion direction are folded and linked while being spaced apart in the insertion direction, and intermediate parts of both side edges in a longitudinal direction of the plate portion comprising a plurality of curved portions, the plate portion being constricted toward a center from both ends in the longitudinal direction, wherein the terminal fitting further comprises a supporting portion, wherein an end of the supporting portion is fixed to the upper wall of the box portion and a tip part of the supporting portion is inserted into the through hole.

2. The terminal fitting of claim 1, wherein:

the plate portions adjacent in the insertion direction, the plate portion and the base portion, and the plate portion and the contact portion are respectively linked by coupling portions having a bent shape, and an odd number of the coupling portions are provided.

3. A chain terminal, comprising:

one carrier; and a plurality of the terminal fittings of claim 1, the plurality of terminal fittings projecting from the carrier while being arranged in parallel, and the terminal fitting including a crimping portion projecting from the box portion.

4. The terminal fitting of claim 1, wherein the base portion extends to close a rear end part of the box portion.

5. The terminal fitting of claim 4, wherein the supporting portion is provided behind and adjacent to the base portion, and extends to close the rear end part of the box portion.

6. A terminal fitting, comprising:

a box portion, a mating terminal being inserted into the box portion from front;

a base portion fixed in the box portion;

a contact portion arranged forward of the base portion, the contact portion electrically contacting the mating terminal being inserted into the box portion; and a spring portion provided to link the base portion and the contact portion, the spring portion supporting the contact portion displaceably in an insertion direction of the mating terminal, the spring portion being shaped such that a plurality of plate portions elongated in a direction intersecting the insertion direction are folded and linked while being spaced apart in the insertion direction, and intermediate parts of both side edges in a longitudinal direction of the plate portion comprising a plurality of curved portions, the plate portion being constricted toward a center from both ends in the longitudinal direction, wherein:

the base portion extends to close a rear end part of the box portion, and the terminal fitting further comprises a supporting portion behind and adjacent to the base portion, the supporting portion extending to close the rear end part of the box portion.

7. The terminal fitting of claim 6, wherein:

the plate portions adjacent in the insertion direction, the plate portion and the base portion, and the plate portion and the contact portion are respectively linked by coupling portions having a bent shape, and an odd number of the coupling portions are provided.

8. A chain terminal, comprising:

one carrier; and a plurality of the terminal fittings of claim 6, the plurality of terminal fittings projecting from the carrier while being arranged in parallel, the terminal fitting including a crimping portion projecting from the box portion.

* * * * *